United States Patent Office 3,530,004
Patented Sept. 22, 1970

3,530,004
FUEL CELL INCLUDING PENTACYANO-COBALTATE - CONTAINING ELECTROLYTE AND METHOD FOR PRODUCING ELECTRICITY
Thomas H. Coffield, Orchard Lake, Mich., assignor to Ethyl Corporation, New York, N.Y., a corporation of Virginia
No Drawing. Filed Mar. 25, 1968, Ser. No. 715,528
Int. Cl. H01m 11/00, 27/00
U.S. Cl. 136—86                                                11 Claims

ABSTRACT OF THE DISCLOSURE

A fuel cell containing alkali metal, alkaline earth metal, or ammonium pentacyanocobaltates as catalysts.

BACKGROUND OF THE INVENTION

A fuel cell is a device for converting the chemical energy of reaction between a fuel and an oxidant directly to electrical energy. Common fuel cells utilize hydrogen as a fuel and oxygen or air as the oxidant. The half-cell reactions can be depicted as follows:

(Anode) $H_2 + 2OH^- \rightarrow 2H_2O + 2e^-$ (Cathode) $\dfrac{2e^- + 1/2\ O_2 + H_2O \rightarrow 2\ OH^-}{H_2 + 1/2\ O_2 \rightarrow H_2O}$ The cell has two electrodes in contact with an electrolyte comprising an aqueous solution of an alkali metal hydoxide. Hydrogen is fed into said cell in contact with the anode and reacts with the electrolyte to form water. Electrons are left behind on the anode surface. Oxygen reacts with water in the vicinity of the cathode to form hydroxide ions and to yield a positive charge on the cathode. When the two electrodes are connected by external electrical means, electrons flow from the anode to the cathode. Inside the cell, hydroxide ions flow from the cathode to the anode in the electrolyte solution, thereby completing the circuit.

Fuel cells offer many advantages. Unlike electrical generators using conventional heating, the efficiency of a fuel cell is not limited by a Carnot-cycle process. Thus, in a fuel cell, thermal efficiencies of as high as 90 percent are theoretically possible. Also, in passing from chemical energy into electricity, fuel cells utilize no mechanical conversion. Thus, fuel cells do not suffer from the inherent losses within boiler-to-turbine and turbine-to-generator systems. Because there are no moving parts, fuel cells have little or no maintenance problems. Fuel cells are characterized by high energy per unit weight. In addition, since there are no moving parts, fuel cells are noiseless. Moreover, fuel cells are characterized by cleanliness, since there are usually no undesirable combustion product.

Fuel cells are adequately treated in Fuel Cells, Will Mitchell, Jr., Academic Press, New York, N.Y. (1963).

This invention comprises the discovery of the efficacious use of alkali metal pentacyanocobaltates and related materials as catalysts in fuel cells. Compounds and a method for their preparation have been described in Nast et al., Z. Anorg. u. Allgrem. Chem. 312, 314–21 (1961). It is known that the anion in these compounds react with molecular oxygen to form the following complex anion:

$[(CN)_5Co^{III}—O—O—Co^{III}(CN)_5]^{-6}$

Aus. J. Chem. 16(6) 954–68 (1963). It is also known that pentacyanocobaltate (II) anion reacts with hydrogen to form $[HCo^1(CN)_5]^{-3}$ Griffith et al., J. Chem. Soc. (1959), 2757–62.

SUMMARY OF THE INVENTION

In essence, this invention comprises the discovery that the electrical output of a fuel cell is enhanced by the incorporation of an alkali metal, alkaline earth metal, or ammonium pentacyanocobaltate in the basic electrolyte employed within the cell. The mechanism for the catalysis is not known. Although not bound by any theory it may well be that the catalyst functions by typing up oxygen in a manner which makes it more accessible for the half-cell reaction which takes place.

Whatever the mechanism, it appears that the action of the pentacyanocobaltate is truly catalytic. This may be due to a regeneration of an active species in situ. Although not bound by any theory, a regeneration of active species may be illustrated by the following equation which illustrates inter-action of oxygen- and hydrogen-containing species to regenerate pentacyanocobaltate anion:

$4HCo(CN)_5^{-3} + [(CN)_5Co—O—O—CO(CN)_5]^{-6} \rightarrow 6[Co(CN)_5]^{-3} + 2H_2O$

DESCRIPTION OF THE PREFERRED EMBODIMENTS

This invention can be illustrated by a preferred embodiment which is as follows:

In a fuel cell utilizing the reaction of hydrogen and oxygen to form electric current, said cell comprising a cathode, anode, and a basic aqueous electrolyte, the improvement comprising incorporation in said electrolyte of a catalytic amount of a catalyst having the formula $M_3Co(CN)_5$ wherein M is an alkali metal or ammonium cation.

In a similar embodiment the catalyst is a compound having the formula $M'_3[Co(CN)_5]_2$ wherein $M'$ is an alkaline earth metal.

There are two ways in which the catalyst can be added to the electrolyte solution. First, preformed electrolyte can be merely admixed therewith. Secondly, the catalyst can be formed by chemical reaction conducted in the electrolyte. Thus the catalyst may be prepared in the electrolyte by reacting an alkali metal, alkaline earth metal, or ammonium cyanide with a cobalt halide. Although not bound by any theory, it is believed that this process can be illustrated by the following equation wherein M is an alkali metal and X is a halogen:

$5KCN + CoCl_2 \rightarrow K_3Co(CN)_5 + 2KCl$

In this process for the preparation of catalysts, the cyanide reactant is preferably an alkali metal cyanide. However, ammonium, tetraalkylammonium and alkaline earth metal pentacyanocobaltates can be formed by reactions analogous to that depicted above. In these instances the byproduct is not an alkali metal halide but an alkaline earth metal, ammonium or tetraalkylammonium halide. These byproducts need not be separated from the pentacyanocobaltate product. Rather, the resultant reaction mixture containing byproduct and product can be incorporated in the electrolyte for the fuel cell. The alkali metal is preferably sodium or potassium, more preferably potassium. In addition, it is preferred that the cobalt halide comprise a halogen having an Atomic Number of at least 17, preferably chlorine or bromine, most preferably chlorine. Although excesses of either reactant can be employed, it is preferred that the reaction be carried out by mixing essentially stoichiometric quantities of reactants.

When this is done, the resultant solution will contain essentially two moles of an alkali metal chloride per each mole of formed alkali metal pentacyanocobaltate.

The catalysts described above are applicable in a wide variety of fuel cells known in the art. They are useful in those alkaline, hydrogen-oxygen cells described in Mitchell (supra). The description of such cells in Mitchell is incorporated by reference herein as if fully set forth.

In such cells the concentration of alkali metal hydroxide in the basic electrolyte is generally up to about 50 weight percent. Potassium hydroxide solutions are preferred. Most preferred solutions contain from about 10 to about 40 weight percent potassium hydroxide. For the purpose of this invention, the electrolyte need not contain added potassium (or other alkali metal) hydroxide. More specifically, the electrolyte to which a catalyst of this invention is added, may be a water-metal cyanide mixture essentially free of added metal hydroxide. In these metal hydroxide-free solutions the concentration of metal cyanide is from about two to about twenty percent. Aqueous potassium cyanide solutions are preferred. The applicability of a cyanide solution having essentially no metal hydroxide added is illustrated in the example following. The procedure of the example is also applicable for other water-metal cyanide solutions wherein the concentration of metal cyanide is 2 to 20 weight percent. Such solutions derived from alkali metal cyanides are preferred.

For purposes of this invention it is only necessary that a catalytic quantity of the catalyst be employed. Catalytic amounts are generally from about 2 to about 20 weight percent. In other words, each 100 parts by weight of water in said electrolyte is admixed with from about 2 to about 20 parts by weight of catalyst. A preferred catalytic range is from about 2 to about 10 weight percent.

The catalytic action of the catalyst of this invention is available over a wide temperature range—say from 0° to 100° C. A preferred temperature range is from 25° to 75° C. Likewise, the catalyst is operable when the pressure of the gas admitted to the fuel cell is up to about 1000 p.s.i.g.

To illustrate the catalytic action of the catalyst of this invention the following example is presented.

EXAMPLE

Smooth platinum screen electrodes (1″ x 2⅛″) were cleaned and platinized. Platinizing was carried out in 2 percent chloroplatinic acid at about 50 ma./cm.$^2$, by reversing polarity about every two minutes for 30 minutes. The resultant black electrodes were cleaned and immersed into each half of a H tube. Electrolyte (0.7 N KCN) was added, and hydrogen/oxygen gas introduction was started. More specifically, hydrogen was passed into the H tube in contact with the anode, and oxygen was passed into the H tube in contact with the cathode. At 25° C., the open circuit voltage was 0.83 v. Under a 10-ohm load a current of 3.9 ma. at 0.05 v. could be passed with no cobalt chloride present.

With the addition of cobalt chloride (0.1 molal.), the open circuit voltage was 0.85 v., and 6 ma. at 0.07 v. could be drawn through a 10-ohm load. The system was made 0.9 N in potassium hydroxide. The open circuit voltage was now 0.82 v. A current of 8 ma. at 0.1 v. could be passed through the 10-ohm load.

The temperature was increased to 75° C. The current passed through a 10-ohm load similarly increased to 17 ma. at 0.15 v. This is a very high output for this system although the resistance between the electrodes was high.

In the example described above, potassium pentacyanocobaltate (II) was obtained upon reaction of cobalt chloride and potassium cyanide. Similar results are obtained when the catalyst is sodium pentacyanobaltate (II). Similar results are obtained when the sodium-containing catalyst is formed from sodium cyanide and cobalt (II) bromide. Similar results are obtained when preformed sodium pentacyanocobaltate (II), or ammonium, or potassium pentacyanobaltate (II) are added to the system such that they are present in the electrolyte in concentrations ranging from 2 to 20 weight percent. Similar results are obtained when ammonium, magnesium, or calcium pentacyanocobaltate are present in a concentration of from 2 to 20 weight percent and when the gas passed over the cathode is air.

Similarly, using concentrations of catalysts mentioned in the example above, the electrical output of basic electrolyte cells described in chapters 5 and 8 of Mitchell (supra) is likewise enhanced. Best results are achieved using fuel cells constructed of materials suitably impervious to corrosion by cyanide, e.g., platinized electrodes. Preferably, the basic electrolyte employed contains 2 to 20 weight percent metal cyanide—in addition to the catalysts and hydroxide. Prefarably, the metal in the cyanide is the same as the metal cation within the metal hydroxide and the metal cation within the pentacyanocabaltate catalyst. The presence of added metal cyanide serves to stabilize the catalyst.

A preferred embodiment of this invention is a solution suitable for use as an electrolyte in such cells. These solutions are water-alkali metal hydroxide-alkali metal pentacyanocobaltate (II) mixtures. In this preferred embodiment the concentration of the alkali metal hydroxide is from about 10 to about 50 weight percent. More preferably the concentration of the pentacyanocobaltate is from about 2 to about 20 weight percent preferably 2 to 10 weight percent. In a highly preferred embodiment the alkali metal hydroxide is potassium hydroxide and the pentacyanocobaltate is potassium pentacyanocobltate (II). These solutions may be made by admixing preformed pentacyanocobaltate in a concentration within the range mentioned above. Alternatively, the catalyst can be formed by reaction of the desired alkali metal cyanide with a cobalt halide as described above. These solutions preferably contain 2 to 20 weight percent metal cyanide, preferably potassium cyanide.

As inferred above, the cation in the catalyst molecule is not critical. Thus the pentacyanocobaltate (II) catalytic anion can be within an alkali metal, alkaline earth metal, or ammonium pentacyanocobaltate. Likewise the cation may be a tetraalkyl ammonium cation wherein the alkyl groups are lower alkyl radicals, i.e., alkyl radicals of up to about 4 carbon atoms.

This invention can be extended to the use of other catalysts, such as those represented by the formulas

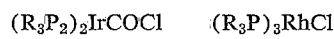

$$(R_3P_2)_2IrCOCl \qquad (R_3P)_3RhCl$$

wherein the groups represented by R are alike or different and are organic radicals such as alkyl or aryl. The rhodium compounds indicated by the above formula are the subject of copending application Ser. No. 514,118, filed Dec. 15, 1965, in the name of Geoffrey Wilkinson. The pertinent disclosure of these rhodium compounds within said copending application is incorporated by reference herein as if fully set forth. Illustrative iridium compounds depicted by the above formula have the same organic groups as those in the rhodium complexes.

The rhodium and iridium compounds have appreciable solubility in organic solvents. Thus they lend themselves for use in fuel cells having electrolytes comprising said solvents.

Although not bound by a theory, it is believed that the rhodium and iridium compounds act in a manner analogous to the pentacyanocobaltates when catalyzing fuel cell processes. Thus, they seem to react with the gaseous reactants to make these reactants "super concentrated" in the vicinity of electrodes, thereby facilitating half-cell reactions.

Having fully described this invention, its outstanding characteristics and the utility thereof, it is desired that the invention be limited solely by the lawful extent of the appended claims.

I claim:
1. In a fuel cell utilizing the reaction of hydrogen and oxygen to form electric current, said cell comprising a cathode, anode, and a basic aqueous electrolyte; the improvement comprising incorporation in said electrolyte, of a catalytic amount of a catalyst, said catalyst being selected from compounds having the formula

$$M_3Co(CN)_5$$

and compounds having the formula $$M'_3[Co(CN)_5]_2$$

wherein M is selected from alkali metals and the ammonium cation, and M' is selected from alkaline earth metals.

2. In a fuel cell comprising a cathode and anode spaced apart and in contact with a basic electrolyte, means for passing hydrogen into contact with said anode, means for passing oxygen into contact with said cathode, electrical conduction means for connecting said anode and said cathode external to said cell, and said electrolyte providing internal electrical connection between said cathode and said anode; the improvement comprising incorporation in said electrolyte, of a catalytic amount of a catalyst, said catalyst being selected from compounds having the formula $M_3Co(CN)_5$, and compounds having the formula $M'_3[Co(CN)_5]_2$, wherein M is selected from alkali metals and the ammonium cation, and M' is selected from alkaline earth metals.

3. A fuel cell of claim 2 wherein said basic electrolyte, in which said catalyst is incorporated, is a water-potassium hydroxide solution wherein the concentration of said potassium hydroxide is from 2 to about 50 weight percent.

4. A fuel cell of claim 3 wherein said solution additionally contains 2 to 20 weight percent of potassium cyanide.

5. A fuel cell of claim 3 wherein the potassium hydroxide concentration is from about 10 to about 40 weight percent.

6. A fuel cell of claim 5 wherein said electrolyte solution additionally contains 2 to 10 weight percent potassium cyanide.

7. A fuel cell of claim 6 wherein the concentration of said catalyst in said basic electrolyte is from about 2 to about 20 weight percent.

8. A fuel cell of claim 7 wherein said electrolyte additionally contains essentially two moles of an alkali metal-halide having the Formula MX wherein M is an alkali metal and X is a halide having an Atomic Number of at least 17; per each mole of said catalyst.

9. A fuel cell of claim 7 wherein said catalyst is potassium pentacyanocobaltate (II).

10. A fuel cell of claim 1 wherein said basic electrolyte is a water-alkali metal cyanide solution essentially free of added metal hydroxide, the concentration of said cyanide being from about 2 to about 20 weight percent.

11. A method of producing an electric current, said method comprising connecting said electrical conduction means in claim 2 and passing hydrogen gas in contact with said anode and passing oxygen gas in contact with said cathode of claim 2.

References Cited

UNITED STATES PATENTS 2,666,748 1/1954 Arthur et al. _____ 252—438
3,393,099 7/1968 Giner et al. _____ 136—86
3,410,727 11/1968 Jasinski _____ 136—86

OTHER REFERENCES

Inorg. Nucl. Chem. 1959, vol. 10 pp. 23 to 27, Pergaman Press Ltd. printed in Northern Ireland, Griffith et al.

The Infra-Red Spectrum and Structure of $$K_4[N_1(CN)_3CO]_2$$

in 23–359.

Brech et al.: "Thermal Diffusion Studies With Redox Electrodes," in Transactions of the Farday Soc., vol 61, No. 511, July 1965, pp. 1511–1516 in 136–860.

ALLEN B. CURTIS, Primary Examiner

U.S. Cl. X.R.

252—438; 23—359; 136—154